(12) United States Patent
Chaon et al.

(10) Patent No.: US 6,646,204 B2
(45) Date of Patent: Nov. 11, 2003

(54) CONTROL CABLE INCLUDING A CABLE-GUIDING DUCT OF POROUS PTFE

(75) Inventors: Regis Chaon, Le Rocheux (FR); Pascal Dugand, Les-Vieux-Moulins (FR)

(73) Assignee: Compagnie Plastic Omnium, Lyons (FR)

( * ) Notice: Subject to any disclaimer, the term of this patent is extended or adjusted under 35 U.S.C. 154(b) by 0 days.

(21) Appl. No.: 10/073,408

(22) Filed: Feb. 13, 2002

(65) Prior Publication Data

US 2002/0117323 A1 Aug. 29, 2002

(30) Foreign Application Priority Data

Feb. 23, 2001 (FR) .............................. 01 02487

(51) Int. Cl.[7] ................................................ H01B 7/18
(52) U.S. Cl. .................. 174/105 R; 74/502.5
(58) Field of Search .................. 174/105 R, 102 R, 174/106 R; 74/502.5

(56) References Cited

U.S. PATENT DOCUMENTS

| 4,099,425 A | 7/1978 | Moore |
| 5,241,880 A | 9/1993 | Mizobata et al. |
| 5,243,876 A | 9/1993 | Mang et al. |
| 5,636,551 A | 6/1997 | Davidson et al. |

FOREIGN PATENT DOCUMENTS

| EP | 684 121 | * 11/1995 |
| JP | 54-85267 | * 7/1979 |

OTHER PUBLICATIONS

US 5,045,600, 9/1991, Giatras et al. (withdrawn)

* cited by examiner

*Primary Examiner*—Chau N. Nguyen
(74) *Attorney, Agent, or Firm*—Oliff & Berridge, PLC

(57) ABSTRACT

A sheathed control cable includes an inner cable, a cable-guide duct of a material having a low coefficient of friction surrounding said cable with clearance, armoring surrounding the cable-guide duct, and an outer sheath providing mechanical protection, wherein the cable-guide duct is a duct of microporous PTFE obtained by lubricated extrusion and that has been subjected, on leaving the extruder die, to simultaneous drawing and heating to a temperature above the sintering temperature of PTFE.

6 Claims, 3 Drawing Sheets

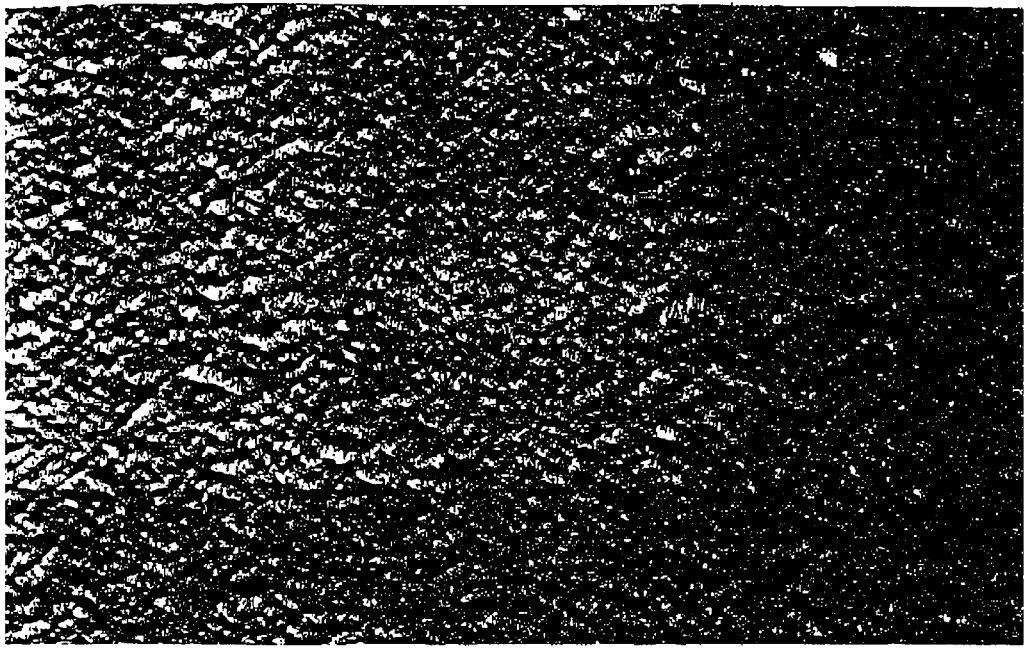
FIG_5
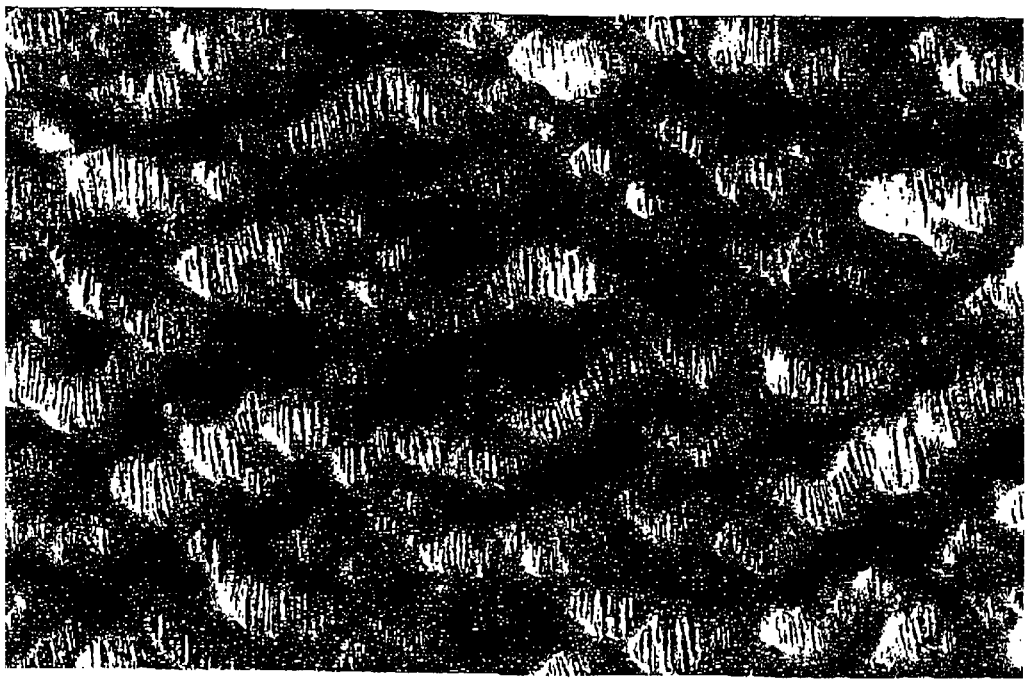
FIG_6

CONTROL CABLE INCLUDING A CABLE-GUIDING DUCT OF POROUS PTFE

The present invention relates to a sheathed control cable of the type comprising an inner cable, generally made of metal, a cable-guiding duct made of a material having a low coefficient of friction surrounding said inner cable, where appropriate a lubricant such as an oil or a grease between the cable and the cable-guide duct, armoring surrounding the cable-guide duct, and an outer sheath providing mechanical protection, generally made of thermoplastic material.

BACKGROUND OF THE INVENTION

Such "Bowden" cables provide push-pull control and are in widespread use in motor vehicles. As particular, non-limiting applications, mention may be made of cables for manually controlling gear boxes, cables for manual clutch control, accelerator control cables, hand-brake control cables, cables for opening a fuel filler hatch, cables for opening doors and windows, cables for controlling seats, cables for opening the hood, the tailgate or the trunk, and cables for controlling air conditioning.

Apart from applications to motor vehicles, mention can be made of uses for bicycle brakes, bicycle derailleurs, or indeed aviation controls.

Depending on the application, the inner cable may be a stranded cable that is bare or plasticized, a single strand that is bare or plasticized, or it may comprise strands having a flat wire wound thereon.

The armoring may be constituted by an armoring layer for providing compression strength, e.g. in the form of a shell constituted by a flat wound wire, and/or a layer that provides traction strength, e.g. constituted by strands wound helically.

To make the cable-guiding duct, proposals have already been made to use fluorine-containing resins, and in particular polytetrafluoroethylene (PTFE).

OBJECTS AND SUMMARY OF THE INVENTION

The present invention seeks to provide a sheathed cable in which the cable-guiding duct presents improved properties, in particular in terms of endurance and of better quality lubrication of the cable contained inside it, while also providing high efficiency.

In this context, for a given number of cycles, efficiency is determined as being the ratio in percentage terms of the axial load applied to the cable received inside the duct and the force needed to move the cable axially.

In the sheathed control cable of the invention, the cable-guide duct is a duct of microporous PTFE obtained by lubricated extrusion and that has been subjected, on leaving the extruder die, to simultaneous drawing and heating to a temperature above the sintering temperature of PTFE.

The cable-guide duct of the sheathed control cable of the present invention can be obtained in particular by implementing the method described in patent No. EP 0 684 121 in the name of the Applicant company, and it presents specific gravity of less than 2.

Traditionally, a lubricating oil or grease is inserted into the cable-guide duct or is applied to the inner cable before it is put into place inside the duct.

In the invention, it is advantageous to introduce such a lubricating oil or grease into the cable-guide duct during the extrusion process, thus obtaining a prefabricated cable-guide duct making it possible, where appropriate, to omit subsequent lubrication when putting the inner cable into place inside the cable-guide duct.

Naturally, the oil or grease that is selected must be capable of being dissolved in the lubricant used in the lubricated extrusion process and it must be sufficiently stable to withstand the temperature to which the cable-guide duct is subjected during the heating step on leaving the extruder die.

In order to confer a structure on the cable-guide duct that is highly fibrous in the longitudinal direction, drawing is performed at the outlet from the extruder die with a drawing ratio (ratio of outlet speed over inlet speed) lying in the range 1.5 to 3, with this taking place for a duration of 5 seconds (s) to 10 s and at a temperature of 350° C.

BRIEF DESCRIPTION OF THE DRAWINGS

Other advantages and characteristics of the present invention will appear on reading the following description of non-limiting embodiments of sheathed control cables of the invention, given with reference to the accompanying drawings, in which:

FIGS. 5 and 6 are macrophotographs of the inside wall of a cable-guide duct in a sheathed cable of the invention.

DETAILED DESCRIPTION OF PREFERRED EMBODIMENTS

Figure 1:
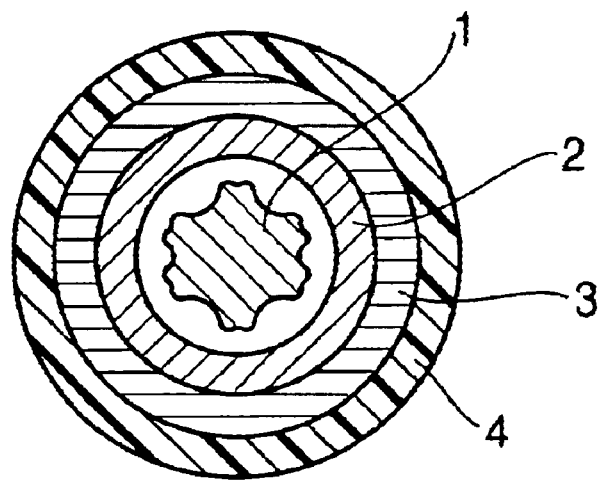
FIG. 1 is a diagrammatic section view of an embodiment of the sheathed control cable of the present invention that can be used, for example, as an accelerator control cable in a motor vehicle.

The sheathed cable shown in FIG. 1 comprises an inner steel cable 1 which is stranded and bare, having a diameter of 1 millimeter (mm) to 2 mm.

A cable-guide duct 2 surrounds the inner cable 1 leaving clearance containing grease or silicone oil, which lubricant can optionally be omitted if the cable-guide duct is prelubricated during the extrusion process.

The duct 2 has an inside diameter of 2.8 mm, an outside diameter of 3.5 mm, and is made of microporous PTFE hot-drawn at the outlet from a lubricated extruder die, the material of the duct presenting a structure that is highly fibrous in the longitudinal direction and presenting microcavities as can be seen in the macrophotographs shown in FIGS. 5 and 6. These macrophotographs are electron images made using secondary electrons in a scanning electronic microscope.

The magnification for the picture of FIG. 5 is 150 and for the picture of FIG. 6 is 1000.

The duct 2 is surrounded by compression-withstanding armoring 3 made of wound flat steel wire, having a width of 4 mm and a thickness of 0.9 mm, the armoring 3 in turn being surrounded by an outer layer 4 of thermoplastic polymer, in particular of polyamide.

A cable-guide 2 of the kind shown in FIG. 1 and containing a stranded cable 1 of the kind shown in FIG. 1 having an inside diameter of 2.8 mm and an outside diameter of 3.5 mm has been subjected to endurance testing on a test bench by applying a weight of 5 kilograms (kg) at a temperature of 80° C., with an S-shaped path and a cycle frequency of 0.5 hertz (Hz).

No rupture was observed after 2 million cycles, with efficiency being about 94% at the end of cycling.

This demonstrates high resistance to wear, and also that the microporosities of the structure of the cable-guide duct provide good retention of lubricating oil or grease, thus guaranteeing excellent lubrication for the cable.

Figure 2:
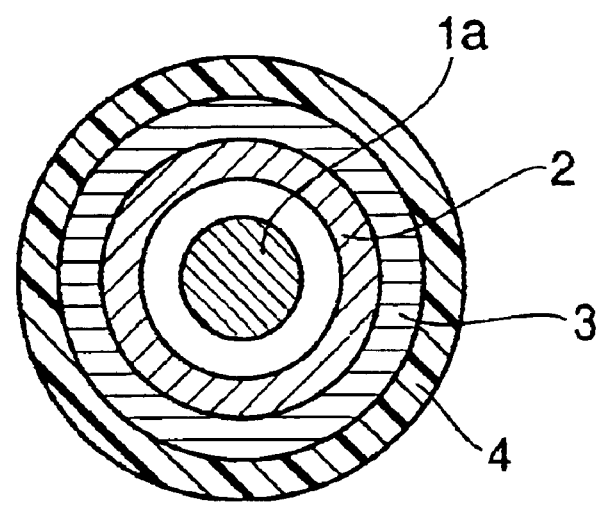
FIG. 2 is a diagrammatic section view of a second embodiment of a sheathed control cable of the present invention that can be used, for example, as a seat control cable in a motor vehicle.

Reference is now made to FIG. 2 which shows a sheathed cable of the invention suitable for use in particular as a control cable for a motor vehicle seat, or indeed for controlling air conditioning.

Unlike the cable of FIG. 1, this cable has an inner cable 1a in the form of a single strand of bare steel with a diameter of 1 mm.

Depending on the application, the cable-guide 2 can have an inside diameter of 1.5 mm, 1.8 mm, or 2.2 mm, with corresponding outside diameters of 2.5 mm, 2.5 mm, or 2.8 mm.

Figure 3:
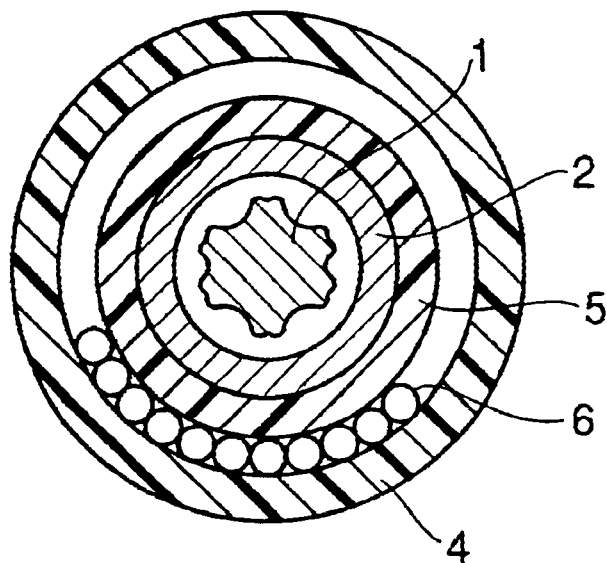
FIG. 3 is a diagrammatic section view of a third embodiment of a sheathed control cable of the present invention that can be used for example as a gearbox control cable in a motor vehicle.
Figure 4:
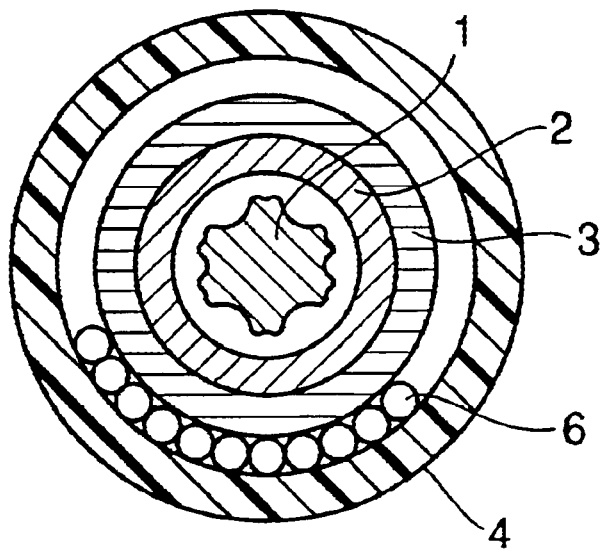
FIG. 4 is a diagrammatic section view of a variant embodiment of the sheathed control cable shown in FIG. 3.

The sheathed cables of the invention shown in FIGS. 3 and 4 both have a stranded inner cable 1 of bare steel wire identical to the cable of FIG. 1, a cable-guide duct 2 made of the same material as the cable-guide duct of the embodiments of FIGS. 1 and 2, and presenting an inside diameter of 3.5 mm and an outside diameter of 4.5 mm, the duct being made in the form of a two-layer structure with a layer 5 of thermoplastic polymer covering, in particular of polyamide or polypropylene having an outside diameter of 6 mm.

The armoring comprises a layer of helically wound strands 6 that provide traction strength.

The embodiment of FIG. 4 differs from that of FIG. 3 in the absence of the intermediate coating 5 and the presence around the duct 2 of a layer of wound flat armoring wire 3 as in the embodiments of FIGS. 1 and 2.

Although the invention is described with reference to particular embodiments, it is clear that the invention is not limited to them in any way and that various modifications or variants can be applied thereto without going beyond the ambit or the spirit of the invention.

What is claimed is:

1. A sheathed control cable, comprising:
   an inner cable;
   a cable-guide duct of a material having a low coefficient of friction surrounding said inner cable with clearance;
   a lubricating oil or grease between the inner cable and the cable-guide duct;
   armoring surrounding the cable-guide duct; and
   an outer sheath providing mechanical protection, wherein the cable-guide duct is a duct of microporous PTFE obtained by lubricated extrusion and that has been subjected, on leaving the extruder die, to simultaneous drawing and heating to a temperature above the sintering temperature of PTFE.

2. A sheathed control cable according to claim 1, wherein the cable-guide duct contains lubricating oil or grease introduced during the lubricated extrusion process.

3. A sheathed control cable according to claim 1, wherein the cable-guide duct presents specific gravity of less than 2.

4. A sheathed control cable according to claim 1, wherein the cable-guide duct presents a structure that is highly fibrous in the longitudinal direction, obtained by drawing at the outlet from the extruder die with a drawing ratio lying in the range 1.5 to 3 for a duration of 5 s to 10 s at a temperature of 350° C.

5. The sheathed control cable according to claim 1, wherein the sheathed control cable is a control cable in a motor vehicle.

6. The sheathed control cable according to claim 1, wherein the sheathed control cable is an accelerator control cable in a motor vehicle.

* * * * *